US012500346B2

(12) United States Patent
Park et al.

(10) Patent No.: US 12,500,346 B2
(45) Date of Patent: Dec. 16, 2025

(54) LIQUID CRYSTAL-BASED MICROSTRIP PATCH ANTENNA FOR WIDENING FREQUENCY TUNING RANGE AND MINIATURIZING RADIATING UNIT

(71) Applicant: Korea Advanced Institute of Science and Technology, Daejeon (KR)

(72) Inventors: Seong Ook Park, Daejeon (KR); Jinki Park, Daejeon (KR); Ye-Eun Chi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 166 days.

(21) Appl. No.: 17/973,405

(22) Filed: Oct. 25, 2022

(65) Prior Publication Data

US 2023/0275352 A1 Aug. 31, 2023

(30) Foreign Application Priority Data

Feb. 28, 2022 (KR) ........................ 10-2022-0025890

(51) Int. Cl.
*H01Q 9/04* (2006.01)

(52) U.S. Cl.
CPC ........... *H01Q 9/0442* (2013.01); *H01Q 9/045* (2013.01)

(58) Field of Classification Search
CPC .... H01Q 9/0442; H01Q 9/045; H01Q 9/0407; H01Q 1/46; H01Q 5/50; H01Q 1/26; H01Q 3/36; H01Q 3/44
See application file for complete search history.

(56) References Cited

U.S. PATENT DOCUMENTS

2009/0278744 A1* 11/2009 Kirino ...................... H01P 1/184
343/700 MS
2020/0243974 A1* 7/2020 Hsieh ........................ H01Q 1/38
2021/0028545 A1* 1/2021 Choi ...................... H01Q 9/045
2021/0313705 A1 10/2021 Linn

FOREIGN PATENT DOCUMENTS

JP 2021101511 A 7/2021
KR 20150040592 A 4/2015
KR 20190045913 A 5/2019

OTHER PUBLICATIONS

Design of Meander Slotted Patch Antenna—Rawat (Year: 2016).*
(Continued)

*Primary Examiner* — Hoang V Nguyen
*Assistant Examiner* — Anna N Hamadyk
(74) *Attorney, Agent, or Firm* — Christensen O'Connor Johnson Kindness PLLC

(57) ABSTRACT

A liquid crystal-based microstrip patch antenna for widening a frequency tuning range and miniaturizing a radiating unit are provided. The microstrip patch antenna includes at least one feeding unit, at least one radiating unit, a plurality of dielectric substrates including the feeding unit and the radiating unit and formed in a stack structure, a liquid crystal cavity interposed between the plurality of dielectric substrates stacked on each other, and at least one DC bias line to receive power from a power supply and to apply an electric field to the liquid crystal cavity through the radiating unit.

20 Claims, 18 Drawing Sheets

(56) References Cited

OTHER PUBLICATIONS

Dai et al., A novel tunable microstrip patch antenna using liquid crystal, Progress in Electromagnetics Research C, vol. 71, pp. 101-109 (Year: 2017).*

Liquid-crystal embedded aperture-coupled microstrip antenna for 5G applications—Kim (Year: 2020).*

Design optimization of reconfigurable LC patch antenna—Kim2 (Year: 2021).*

Dai et al. "A novel tunable microstrip patch antenna using liquid crystal". (Year: 2017).*

Rawat et al. "Design of meander slotted patch antenna for wireless application—a review". (Year: 2016).*

Kim et al. "Liquid-crystal-embedded aperture-coupled microstrip antenna for 5G applications". (Year: 2020).*

Kim et al. "Design Optimization of Reconfigurable Liquid Crystal Patch Antenna". (Year: 2021).*

* cited by examiner $V = V_{max}$

LIQUID CRYSTAL-BASED MICROSTRIP PATCH ANTENNA FOR WIDENING FREQUENCY TUNING RANGE AND MINIATURIZING RADIATING UNIT

CROSS-REFERENCE TO RELATED APPLICATIONS

A claim for priority under 35 U.S.C. § 119 is made to Korean Patent Application No. 10-2022-0025890 filed on Feb. 28, 2022, in the Korean Intellectual Property Office, the entire contents of which are hereby incorporated by reference.

BACKGROUND

Embodiments of the inventive concept described herein relate to a liquid crystal-based microstrip patch antenna for widening a frequency tuning range and miniaturizing a radiating unit. More specifically, embodiments of the inventive concept described herein relate to a liquid crystal-based microstrip patch antenna for widening a frequency tuning range and miniaturizing a radiating unit, capable of maximizing an electrically variable characteristic of a frequency in an antenna using liquid crystal (LC).

To avoid interference between mutually different wireless communication devices, frequency bands are distributed depending on uses in Korea or abroad. Accordingly, to exhibit the excellent performance in each of devices having mutually different uses, an antenna suitable for the frequency band of each device should mounted in the device. This is because the characteristics, such as the radiation pattern, the resonance frequency, and the bandwidth, of the antenna exert the greatest influence on the performance of a wireless communication system. As various multimedia is employed, the demand for antennas having frequency bands necessary for the multimedia is increased. In particular, a mobile communication device to perform various wireless communication services, such as Bluetooth, Wi-Fi, and 4G LTE/5G NR, in one device has a plurality of antennas corresponding to the relevant service operating frequencies in a single device.

In this case, when an antenna tunable in the operating frequency band is designed, the antenna may be mounted on a wireless communication device operating in different frequency bands. Accordingly, a mobile communication device requiring several antennas may be miniaturized, as the volume of the several antennas is reduced.

The tuning of the frequency of the antenna may be performed through a mechanically control manner and an electrically control manner. The electrically control manner has been used to more precisely control the frequency, and a diode and a MEM switch have been extensively used in the electrically control manner. Recently, the applicability of liquid crystal mainly employed in a conventional optical field has been re-considered, and the variable characteristic of an antenna has been realized by using the liquid crystal.

The phase of the liquid crystal is changed depending on the intensity of an electric field applied to the liquid crystal, so the dielectric characteristic of the liquid crystal is varied in a microwave band. Since the characteristic of the antenna significantly depends on the dielectric substance used in the design. Accordingly, the change in the characteristic of the antenna may be induced by electrically changing the dielectric characteristic of the liquid crystal in the antenna. A microstrip patch antenna may be used to design a frequency-tunable antenna based on liquid crystal and a higher gain characteristic of the microstrip patch antenna may be more simply obtained through a low-cost printing manner. In this case, after injecting the liquid crystal between a radiating unit and a grounding unit of the microstrip patch antenna, the potential difference between the radiating unit and the grounding unit is controlled to tune the frequency.

However, the narrowband characteristics of the microstrip patch antenna are not suitable for antennas operating in multiple bands. To overcome this, a liquid crystal-based microstrip patch antenna having a frequency tuning range more widened than that of a conventional antenna is required.

PRIOR ART (Patent Document 1) Korean Patent Registration No. 10-1585299.

SUMMARY

Embodiments of the inventive concept provide a technology on a liquid crystal-based microstrip patch antenna for widening a frequency tuning range and miniaturizing a radiating unit. More specifically, embodiments of the inventive concept provide a liquid crystal-based microstrip patch antenna for widening a frequency tuning range and miniaturizing a radiating unit by using a Meander line slot (MLS) such that an electrically variable frequency characteristic is maximized in an antenna using liquid crystal (LC).

Embodiments of the inventive concept provide a technology on a liquid crystal-based microstrip patch antenna for widening a frequency tuning range and miniaturizing a radiating unit, capable of widening the frequency tuning range by providing a liquid-crystal-based antenna having a frequency tuning amount increased even with the radiating unit smaller than the conventional radiating unit, as the Meander line slot is applied to the microstrip patch.

Embodiments of the inventive concept provide a liquid crystal-based microstrip patch antenna for widening a frequency tuning range and miniaturizing a radiating unit, capable of remarkably reducing the size of a radiating unit as compared to the size of a conventional radiating unit by applying a Meander line slot to the radiating unit to miniaturize the antenna, such that the antenna is mounted on a smaller device supporting various wireless communication services.

According to an exemplary embodiment, a microstrip patch antenna based on liquid crystal may include at least one feeding unit, at least one radiating unit, a plurality of dielectric substrates including the at least one feeding unit and the at least radiating unit and formed in a stack structure, a liquid crystal cavity interposed between the plurality of dielectric substrates stacked on each other, and at least one direct constant (DC) bias line to receive power from a power supply and to apply an electric field to the liquid crystal cavity through the at least one radiating unit.

The feeding unit may have a feeding structure to transmit or receive a broadband frequency signal, as a resonance frequency of the antenna varies.

The feeding unit may include an aperture coupling slot having a form of an H-slot to feed a broadband frequency.

The radiating unit may include a conductive metal patch including a Meander line slot to widen a tuning range of an operating frequency of the antenna and to miniaturize the antenna.

The radiating unit may include a first radiating unit disposed under the liquid crystal cavity and provided in a patch type, and a second radiating unit disposed above the liquid crystal cavity provided in a patch type. A potential difference between the first radiating unit and the second radiating unit may change an intensity of the electric field applied to the liquid crystal cavity, such that a dielectric characteristic of the liquid crystal varies.

The liquid crystal cavity may be interposed between the plurality of dielectric substrates in which the radiating unit and the ground surface are positioned, and may have a structure filled with the liquid crystal without leakage of the liquid crystal, as the liquid crystal is injected into the liquid crystal cavity.

The liquid crystal cavity may be interposed between the plurality of radiating units, and determined to be larger than patches of the plurality of radiating units, based on a fringe field of a resonance region.

The DC bias line may be disposed in the radiating unit, and may be to supply power from an external power supply of the antenna to have a potential difference from the ground surface, such that a phase of the liquid crystal cavity is changed by inducing a change in a dielectric characteristic of the liquid crystal.

The DC bias line may include a first DC bias line to receive the power from the power supply to apply a voltage to the first radiating unit, and a second DC bias line to receive the power from the power supply to apply a voltage to the second radiating unit.

According to an exemplary embodiment, a microstrip patch antenna based on liquid crystal may include a first substrate including a second radiating unit provided in a patch type, and a second bias line to receive power from a power supply such that a voltage is applied to the second radiating unit, a second substrate disposed under the first substrate, and including a liquid crystal cavity for injecting liquid crystal, a third substrate disposed under the second substrate, and including a first radiating unit provided in the patch type and a first DC bias line to receive the power from the power supply such that a voltage is applied to the first radiating unit, and a fourth substrate disposed under the third substrate, and including a feeding unit and the ground surface and having a feeding structure to transmit a signal from the feeding unit to the first radiating unit.

The first substrate, the second substrate, the third substrate, and the fourth substrate may be a plurality of dielectric substrates formed in a stack structure.

The second radiating unit may include a conductive metal patch including a conductive metal patch including a Meander line slot to widen a tuning range of an operating frequency of the antenna and to miniaturize the antenna.

The second DC bias line may be connected to the second radiating unit to apply a voltage to make a potential difference with the first radiating unit of the third substrate.

The liquid crystal cavity may be interposed between a plurality of dielectric substrates including the first radiating unit and the second radiating unit, and has a structure filled with the liquid crystal without leakage of the liquid crystal, as the liquid crystal is injected into the liquid crystal cavity.

The liquid crystal cavity may be provided under the second radiating unit of the first substrate, and may be determined to be larger than a patch of the second radiating unit, based on a fringe field of a resonance region.

A potential difference between the first substrate and the third substrate may change an intensity of an electric field applied to the liquid crystal cavity of the second substrate, such that a dielectric characteristic of the liquid crystal varies.

The first DC bias line may be disposed in the first radiating unit of the third substrate to supply power from an external power supply of the antenna to have a potential difference from the ground surface, such that a phase of the liquid crystal cavity is changed by inducing a change in a dielectric characteristic of the liquid crystal.

The feeding unit may have a feeding structure including an aperture coupling slot to transmit and receive a broadband frequency signal, as a resonance frequency of the antenna varies.

The aperture coupling slot may have a form of an H-slot to feed a broadband frequency.

The fourth substrate may include a transition structure between a coaxial line for power-feeding of a microstrip line and the microstrip line, and a plurality of conductive vias may be disposed in the transition structure.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
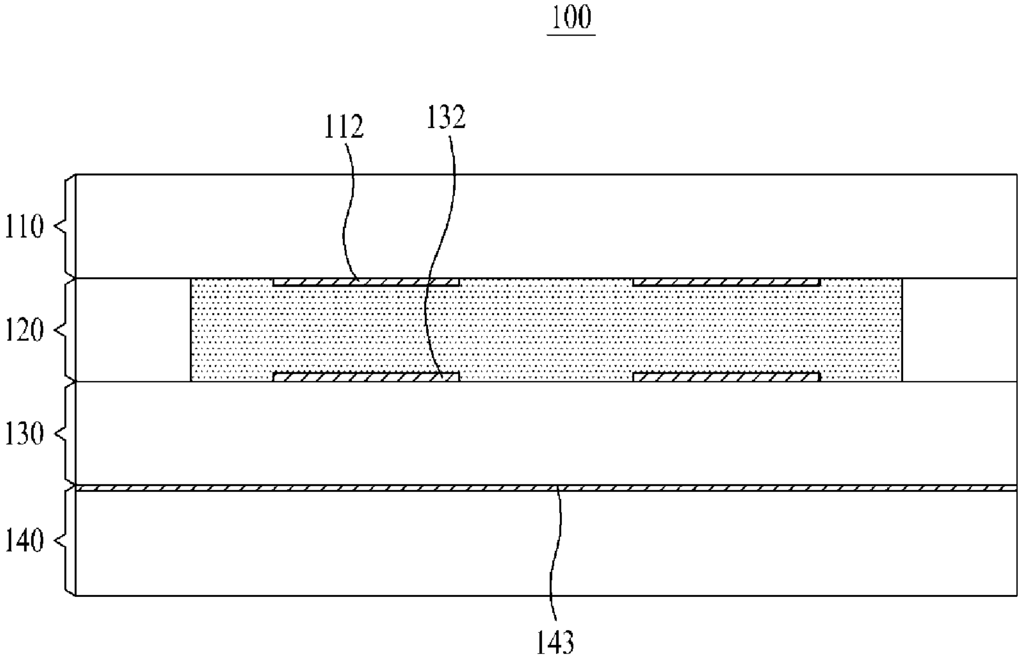
FIG. 1 is a cross-sectional view illustrating a stack structure of a liquid crystal-based microstrip patch antenna employing a Meander line slot according to an embodiment of the inventive concept.

Hereinafter, embodiments of the inventive concept will be described with reference to accompanying drawings. The embodiments of the inventive concept may be modified in various forms, and the scope of the inventive concept should not be construed to be limited by the embodiments of the inventive concept described in the following. In addition, the embodiments of the inventive concept are provided to describe the inventive concept for those skilled in the art more completely. For a clear description, forms, sizes, and the like of elements may be exaggerated in a drawing.

Embodiments of the inventive concept are to expand a frequency tuning range of a microstrip patch antenna (a liquid crystal-based microstrip patch antenna; an antenna) based on liquid crystal. To this end, a Meander line slot is applied to a microstrip patch. Accordingly, a liquid crystal-based antenna having an increased frequency tuning range may be provided by using even with a smaller radiating unit more reduced in size as compared with a conventional radiating unit.

According to one embodiment of the inventive concept, the liquid crystal-based microstrip patch antenna may include at least one feeding unit, at least one radiating unit, a plurality of dielectric substrates having a structure in which a feeding unit and a radiating unit region are disposed and stacked, a liquid crystal cavity interposed between the plurality of dielectric substrates, and at least one direct constant (DC) bias line to receive power from a power supply to apply an electric field to the liquid crystal cavity through the radiating unit.

The feeding unit may have a feeding structure to transmit or receive a broadband frequency signal, as a resonance frequency of an antenna varies. For example, the feeding unit may include an aperture coupling slot in the form of an H-slot to feed a broadband frequency.

The radiating unit may include a conductive metal patch including a Meander line slot, to expand a tunable range of the operating frequency of the antenna and to miniaturize the antenna. More particularly, the radiating unit may include a first radiating unit disposed under the liquid crystal cavity provided in the patch type and a second radiating unit disposed above the liquid crystal cavity and provided in the patch type. The potential difference between the first radiating unit and the second radiating unit may change the intensity of an electric field applied to the liquid crystal cavity, thereby changing the dielectric characteristics of the liquid crystal.

The liquid crystal cavity is positioned between a plurality of dielectric substrates in which the radiating unit and the ground surface are positioned, and may have a structure in which the liquid crystal is injected to be filled without leakage. Such a liquid crystal cavity is disposed between a plurality of radiating units, and may be determined to be larger than patches of the plurality of radiating units based on the fringe field of the resonance region.

The DC bias line may be provided in the radiating unit, and may supply power from the external power supply of the antenna to have a potential difference from the ground surface such that the phase of the liquid crystal cavity is varied by inducing variations in the dielectric characteristics of the liquid crystal. More particularly, the DC bias line may include a first DC bias line to receive power from the power supply to apply a voltage to the first radiating unit, and a second DC bias line to receive power from the power supply to apply a voltage to the second radiating unit.

Hereinafter, a liquid crystal-based microstrip patch antenna according to an embodiment of the inventive concept will be described in more detail. In the following description, for the convenience of explanation, a top surface of each layer of the liquid crystal-based microstrip patch antenna will be expressed as a front surface, and a bottom surface of each layer will be expressed as a rear surface.

Figure 2:
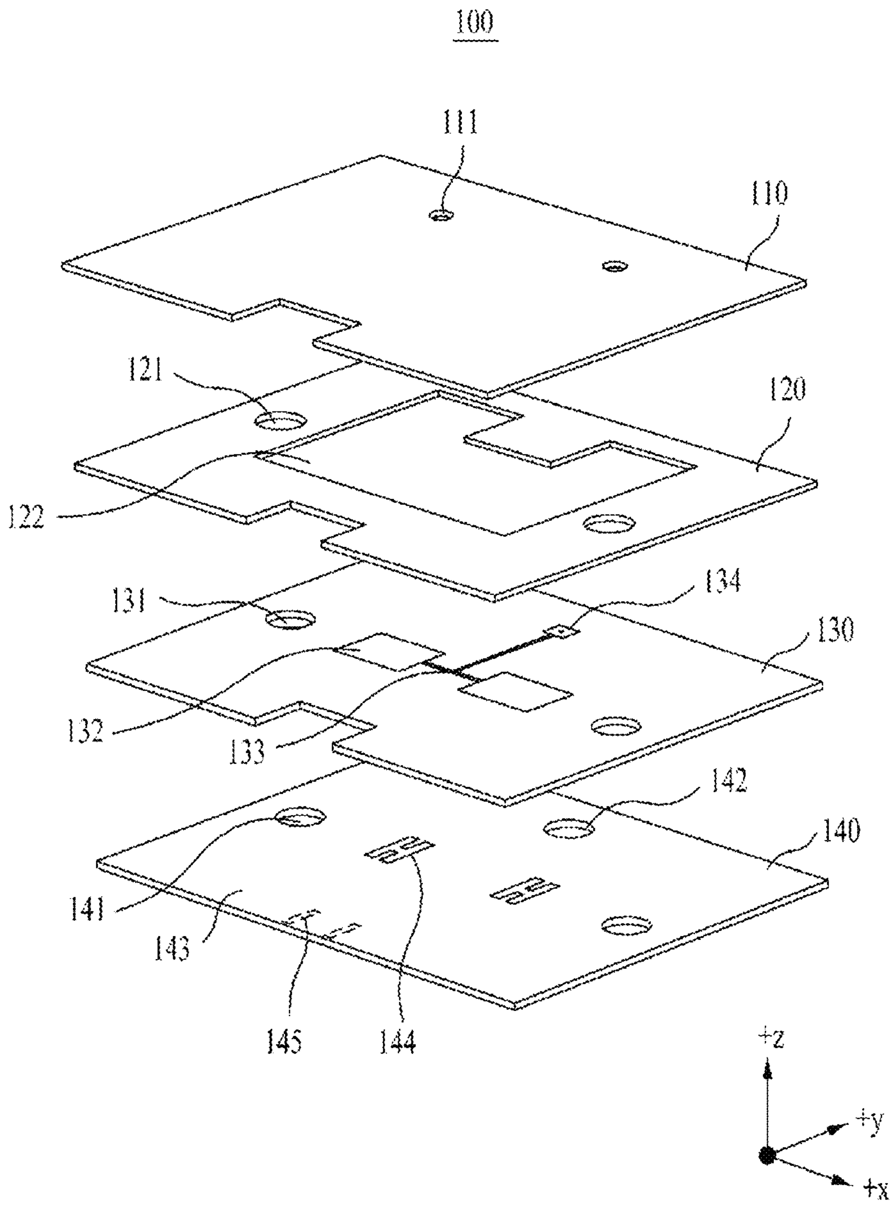
FIG. 2 is an exploded perspective view illustrating a liquid crystal-based microstrip patch antenna employing a Meander line slot according to an embodiment of the inventive concept.
Figure 3:
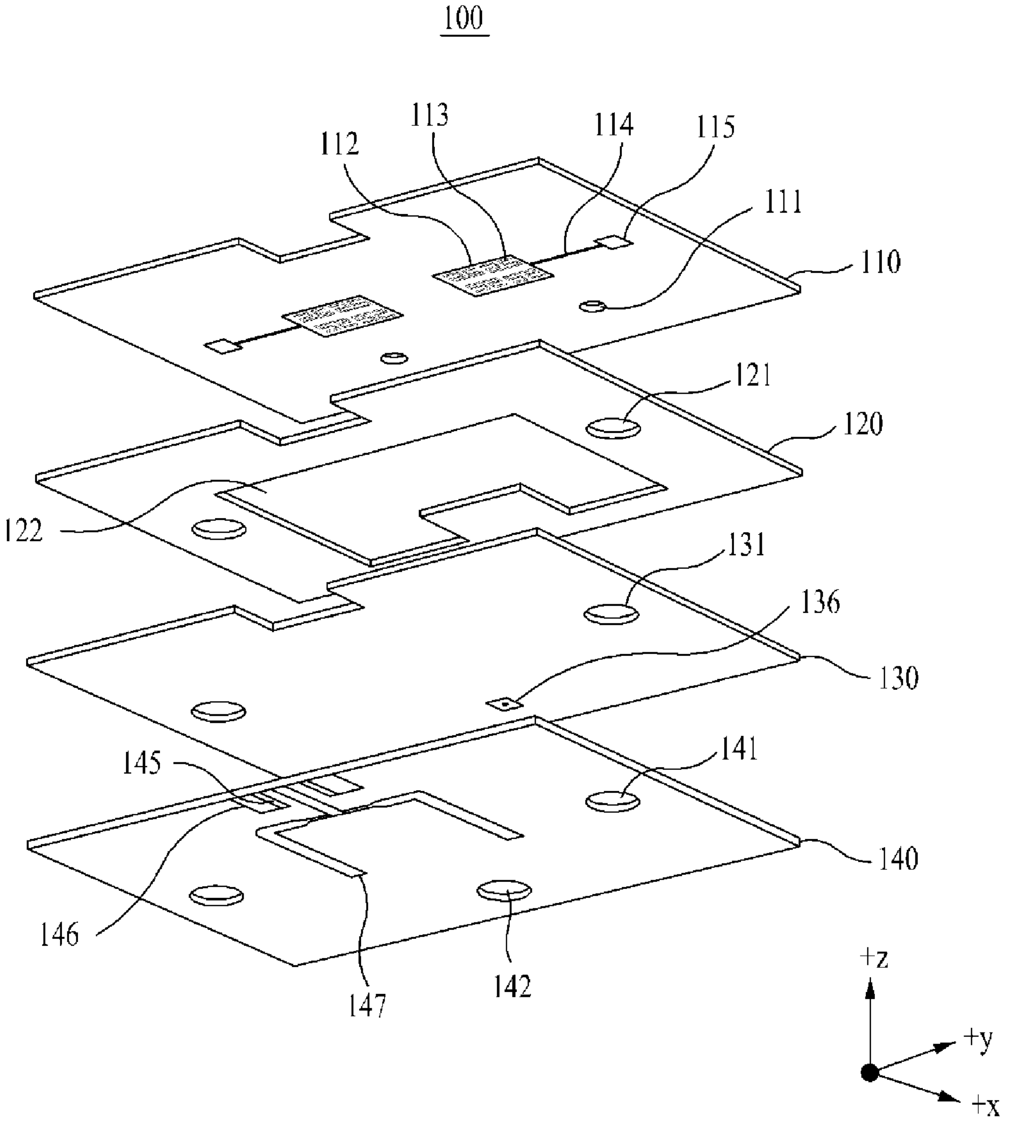
FIG. 3 is a bottom exploded perspective view illustrating a liquid crystal-based microstrip patch antenna employing a Meander line slot according to an embodiment of the inventive concept.

FIG. 1 is a cross-sectional view illustrating a stack structure of the liquid crystal-based microstrip patch antenna employing a Meander line slot according to an embodiment of the inventive concept, and FIG. 2 is an exploded perspective view illustrating a liquid crystal-based microstrip patch antenna employing a Meander line slot according to an embodiment of the inventive concept. FIG. 3 is a bottom exploded perspective view illustrating a liquid crystal-based microstrip patch antenna employing a Meander line slot according to an embodiment of the inventive concept.

FIGS. 1 to 3 illustrate stack structures of four dielectric substrates which perform an operation of propagating a radio wave, an operation of variably changing a dielectric characteristic of a liquid crystal, or a radiating operation according to an embodiment of the inventive concept. However, this is provided only for the illustrative purpose, the stack structure may be formed to have four layers or less, or four layers or more to expand the range of use of the antenna. For example, an additional radiation layer may be formed to increase antenna gain. For another example, the feeding unit and the radiating unit may be integrated into one layer to be implemented into three layers.

Referring to FIGS. 1 to 3, an antenna 100 according to an embodiment of the inventive concept may include a first substrate 110 including a second radiating unit 112 in a patch type, and a second bias line 114 to receive power from the power supply to apply the voltage to the second radiating unit 112, a second substrate 120 interposed between substrates stacked on each other and having a liquid crystal cavity 122 for injecting liquid crystal, a third substrate 130 including a first radiating unit 132 in the patch type and a first DC bias line 133 to receive power from the power supply to apply a voltage to the first radiating unit 132, and a fourth substrate 140 including a feeding unit and the ground surface 143 and having a feeding structure to transmit a signal from the feeding unit to the first radiating unit 132. In this case, the first substrate 110, the second substrate 120, the third substrate 130, and the fourth substrate 140 may be a plurality of dielectric substrates formed in a stack structure.

The first substrate 110 may include the second radiating unit 112 provided in the patch type, and the second DC bias line 114 to receive power from the power supply and to apply a voltage to the second radiating unit 112. The second radiating unit 112 may include a conductive metal patch including a Meander line 113 slot to expand the tunable range of the operating frequency of the antenna 100 and to miniaturize the antenna 100. In this case, in the second radiating unit 112 employing the Meander line slot 113, the shape and position of the patch and Meander line slot 113 may be determined to expand the frequency tuning range of the antenna 100. In addition, the second DC bias line 114 may be connected to the second radiating unit 112 to apply a voltage and to make a potential difference with the first radiating unit 132 of the third substrate 130. The second DC bias line 114 may have various paths to minimize interference with radiation of the antenna 100.

The second substrate 120 may be disposed under the first substrate, and may include the liquid crystal cavity 122 for injecting liquid crystal between the stacked substrates. The liquid crystal cavity 122 may be interposed between the dielectric substrates including the first radiating unit 132 and the second radiating unit 112 and may have a structure in which the liquid crystal may be injected and filled without leakage. In particular, the liquid crystal cavity 122 may be disposed under the second radiating unit 112 of the first substrate 110, and may be determined to be larger than the patch of the second radiating unit 112 based on the fringe field of the resonance region. The potential difference between the first substrate 110 and the third substrate 130 may change the intensity of the electric field applied to the liquid crystal cavity 122 of the second substrate 120, thereby changing the dielectric characteristics of the liquid crystal.

The third substrate 130, which is disposed below the second substrate 120, may include the first radiating unit 132 provided in the patch type, and the first DC bias line 133 to receive power from the power supply and to apply the voltage to the first radiating unit 132. The first radiating unit 132 may be provided in the patch type and may include the Meander line slot 113. In this case, the first radiating unit 132 may be determined to have an appropriate shape and size depending on the use frequency band of the antenna 100. In addition, the first DC bias line 133 is disposed on the first radiating unit 132 of the third substrate 130, and used to supply power from the external power supply of the antenna 100 to have a potential difference from the ground surface 143 to change the phase of the liquid crystal cavity 122 by inducing a change in the dielectric characteristics of the liquid crystal.

The fourth substrate 140 may be disposed under the third substrate 130, have a feeding unit and the ground surface 143, and may have a feeding structure to transmit a signal from the feeding unit to the first radiating unit 132. The feeding unit may have a feeding structure including an aperture coupling slot 144 to transmit and receive a broadband frequency signal, as the resonance frequency of the antenna 100 varies. In other words, the fourth substrate 140 may include the microstrip structure to receive a signal from a coaxial cable and transmit the signal to another layer and the aperture coupling slot 144 for broadband power feeding. For example, the aperture coupling slot 144 may be formed in the form of an H-slot to feed a broadband frequency. Meanwhile, the width of the microstrip structure may be determined depending on the operating frequency band of the antenna 100 and the thickness and dielectric characteristics of the substrate. The shape and position of a transition structure 146 may be determined to reduce propagation loss resulting from changes in the coaxial line and the microstrip power feeding form may be determined. In the aperture coupling slot 144, a slot shape, a slot position, and a slot length may be determined such that the frequency signal of the designed antenna 100 is fed in broadband.

In addition, the fourth substrate 140 includes the transition structure 146 between the coaxial line for power-feeding of the microstrip line 147 and the microstrip line 147, and a plurality of conductive vias 145 may be provided in the transition structure 146.

Figure 4A:
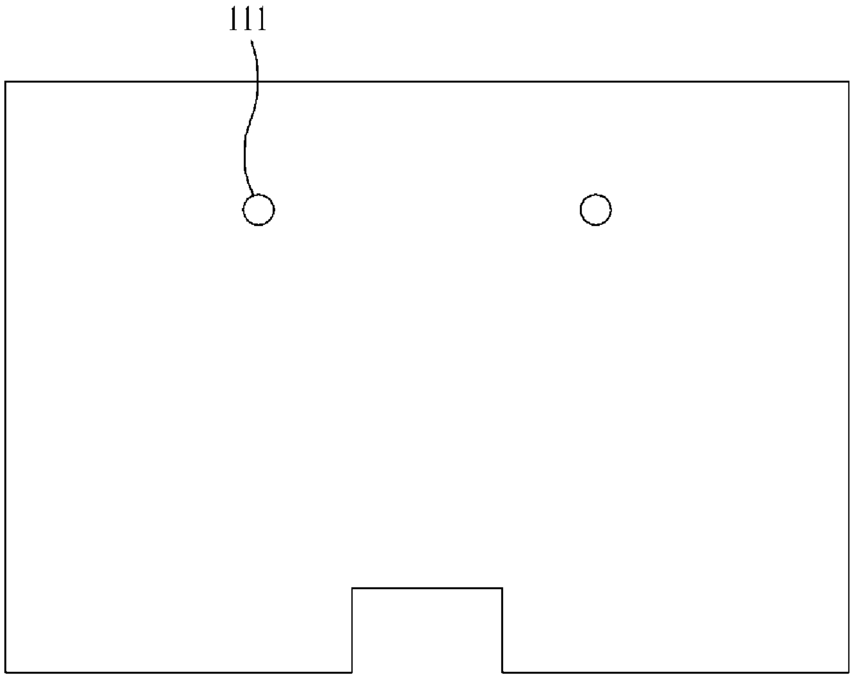
FIGS. 4A and 4B are views illustrating front and rear surfaces of a first substrate of a liquid crystal-based microstrip patch antenna employing a Meander line slot according to an embodiment of the inventive concept.
Figure 4B:
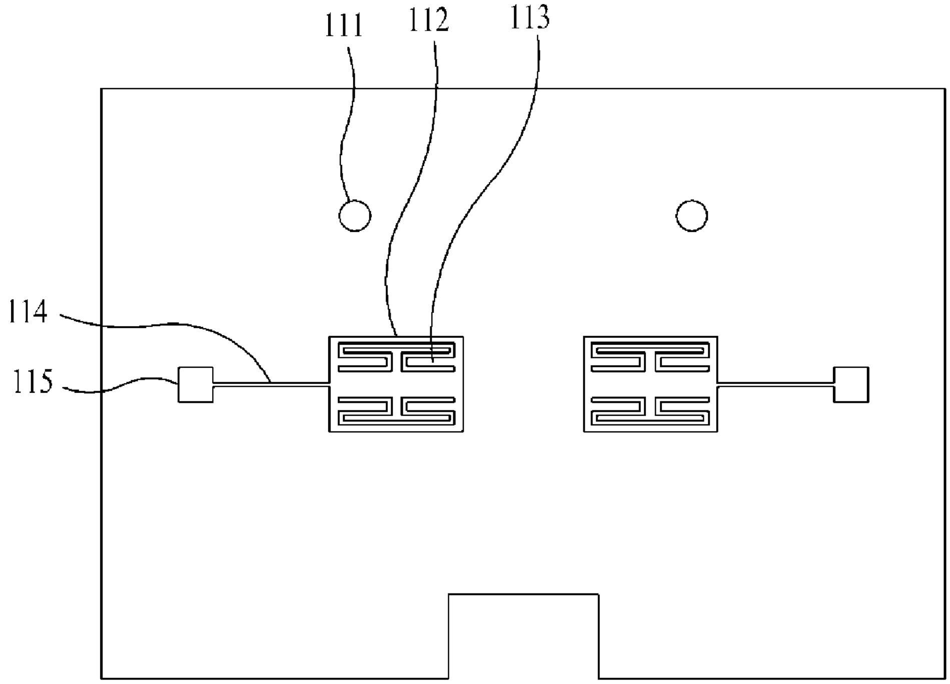

FIGS. 4A and 4B are views illustrating front and rear surfaces of a first substrate of a liquid crystal-based microstrip patch antenna employing a Meander line slot according to an embodiment of the inventive concept.

Referring to FIGS. 4A and 4B, the second radiating unit 112 of the first substrate 110 in the antenna 100 MAY finally radiate a radio signal, or receive a radio signal for the first time from another radio generator. According to embodiments of the inventive concept, the second radiating unit 112 may be implemented in a suitable form, such as a rectangular patch, or a circular patch, depending on the purpose of a wireless device on which the antenna 100 is mounted. For example, the circular patch may be used to maintain radio wave intensity transmitted and received even if the device is rotated.

For example, the second radiating unit 112 may be provided in the form of a rectangular patch and may employ the Meander line slot 113. When the Meander line slot 113 is employed, an additional frequency resonance occurs to expand the frequency tuning range of the antenna 100. In this case, the number and length of Meander line slots 113 are not limited to the above embodiment, and the shapes of the Meander line slots 113 may be optimized depending on a target antenna operating frequency.

The second DC bias line 114 on the rear surface of the first substrate 110 is connected to the second radiating unit 112 to make a potential difference with the first radiating unit 132 of the third substrate 130 and to apply a voltage. The potential difference between the first substrate 110 and the third substrate 130 causes a change in the intensity of the electric field applied to the liquid crystal cavity 122 of the second substrate 120, thereby changing the dielectric characteristics of the liquid crystal. This has the same effect as the change of the dielectric constant of the dielectric substrate which is an important variable in the design of the microstrip patch antenna. Accordingly, the operating frequency and bandwidth of the antenna may be changed.

Meanwhile, a soldering pad (a bias soldering pad) 115 may be disposed at one end of the second DC bias line 114 on the rear surface of the first substrate 110 to receive DC power from an external power supply of the antenna 100 through a conductive line.

After manufacturing the stack structure of the antenna 100, the liquid crystal may be injected into a region for the liquid crystal cavity 122 of the second substrate 120 through a liquid crystal injecting hole 111 of the dielectric substrate of the first substrate 110. The position of the liquid crystal injecting hole 111 may be disposed close to the edge of the antenna 100 to minimize an effect on the resonance of the radiating unit of the antenna 100.

Figure 5A:
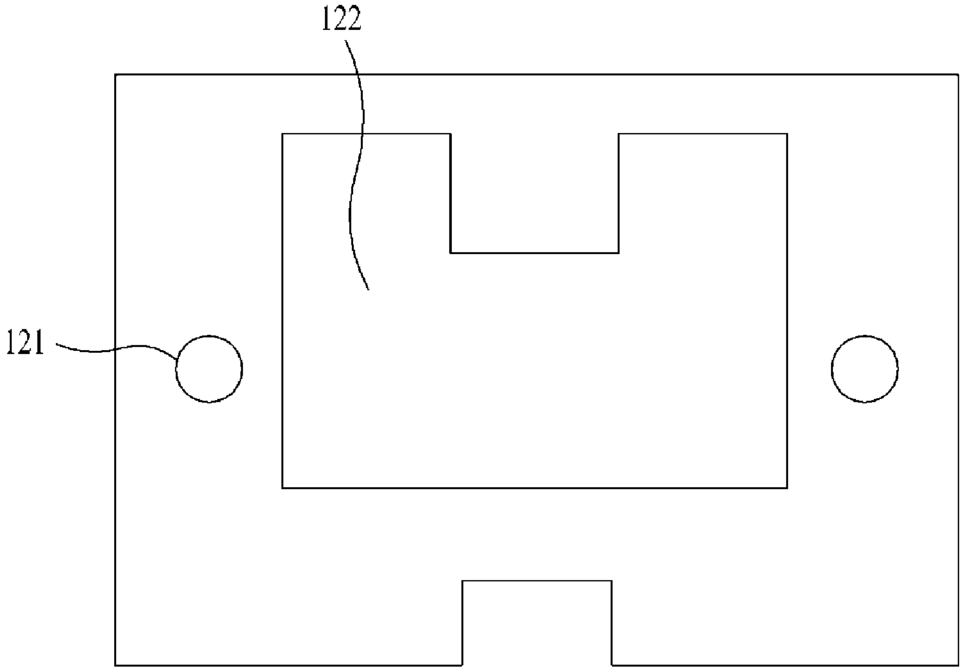
FIGS. 5A and 5B are views illustrating front and rear surfaces of a second substrate of a liquid crystal-based microstrip patch antenna employing a Meander line slot is applied according to an embodiment of the inventive concept.
Figure 5B:
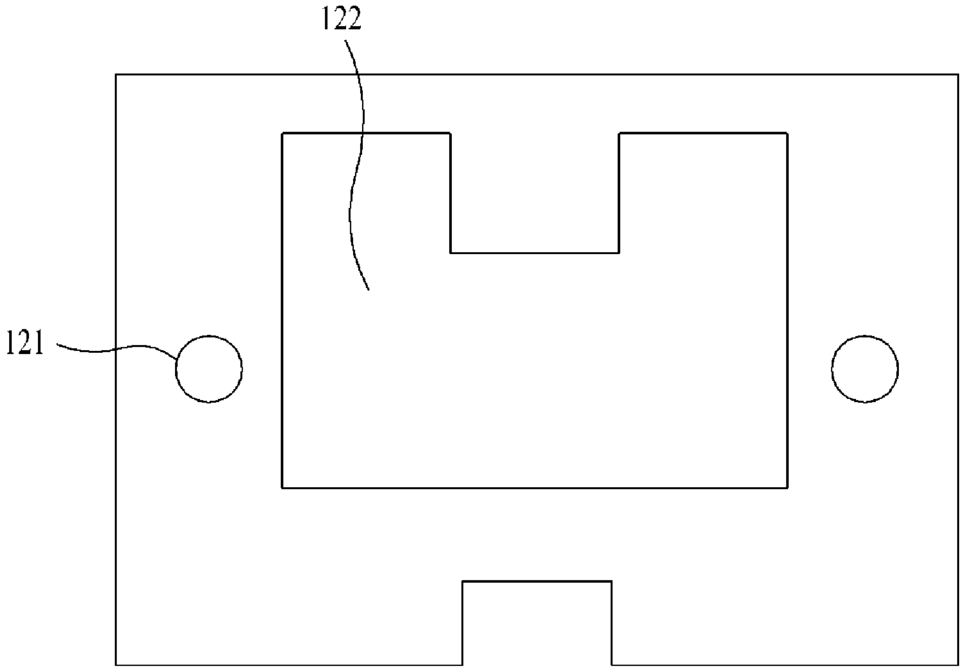

FIGS. 5A and 5B are views illustrating front and rear surfaces of a second substrate of a liquid crystal-based microstrip patch antenna employing a Meander line slot according to an embodiment of the inventive concept.

Referring to FIGS. 5A and 5B, the second substrate 120 has the liquid crystal cavity 122 for frequency tuning. The antenna 100 is designed to be suitable for forming an electric field on the second substrate 120. Preferably, the antenna 100 is designed by using a liquid crystal material having the variable characteristic in an electrical phase. For example, the liquid crystal material may be pure liquid crystal, such as 5CB (4-Cyano-4'-pentylbiphenyl), or may include E7 which is the mixture of materials, such as 4-Cyano-4'-pentylbiphenyl, 4-cyano-4'-n-heptyl-biphenyl, 4-cyano-4'-n-oxyoctyl-biphenyl, 4-cyano-4"-n-peptyl-p-terphenyl.

In this case, a bias applying hole 121 of the second substrate 120 is an empty space for soldering the conductive line to the bias soldering pad 115 of the first substrate 110 after the antenna is stacked.

Figure 6A:
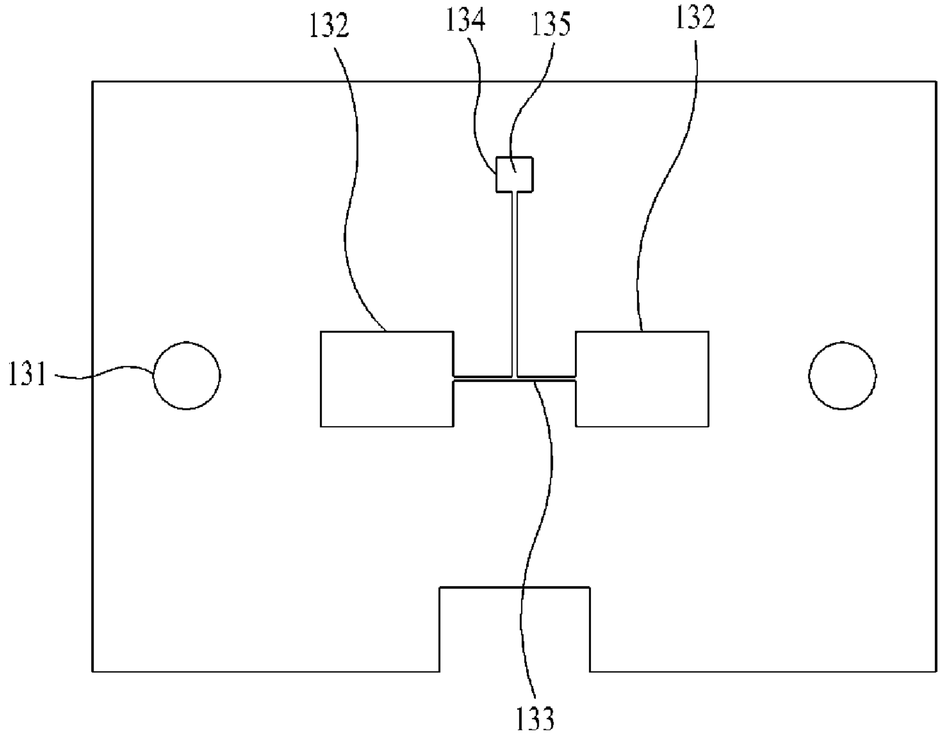
FIGS. 6A and 6B are views illustrating front and rear surfaces of a third substrate of a liquid crystal-based microstrip patch antenna employing a Meander line slot according to an embodiment of the inventive concept.
Figure 6B:
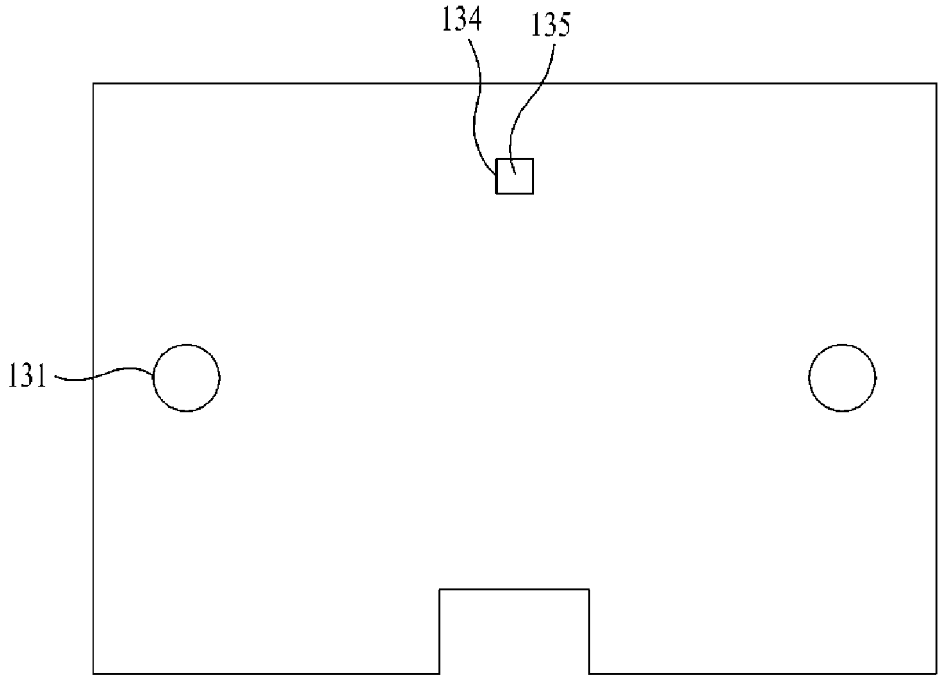

FIGS. 6A and 6B are views illustrating front and rear surfaces of a third substrate of a liquid crystal-based microstrip patch antenna employing a Meander line slot according to an embodiment of the inventive concept.

Referring to FIGS. 6A and 6B, the first radiating unit 132 of the third substrate 130 has the form of the rectangular patch having specifications determined based on the principle of a microstrip patch antenna. The shape of the first radiating unit 132 is determined according to the target operating frequency of the antenna.

In this case, a bias applying hole 131 of the third substrate 130 is an empty space for soldering the conductive line to the bias soldering pad 115 of the first substrate 110 after the antenna is stacked.

A soldering pad 134 may be disposed at one end of the first DC bias line 133 on the rear surface of the third substrate 130 to receive DC power from the external power supply of the antenna 100 through the conductive line. The soldering pad 134 of the third substrate 130 may be connected to the rear pad of the third substrate 130 through a via 135 and may be designed to be soldered onto the rear surface.

Figure 7A:
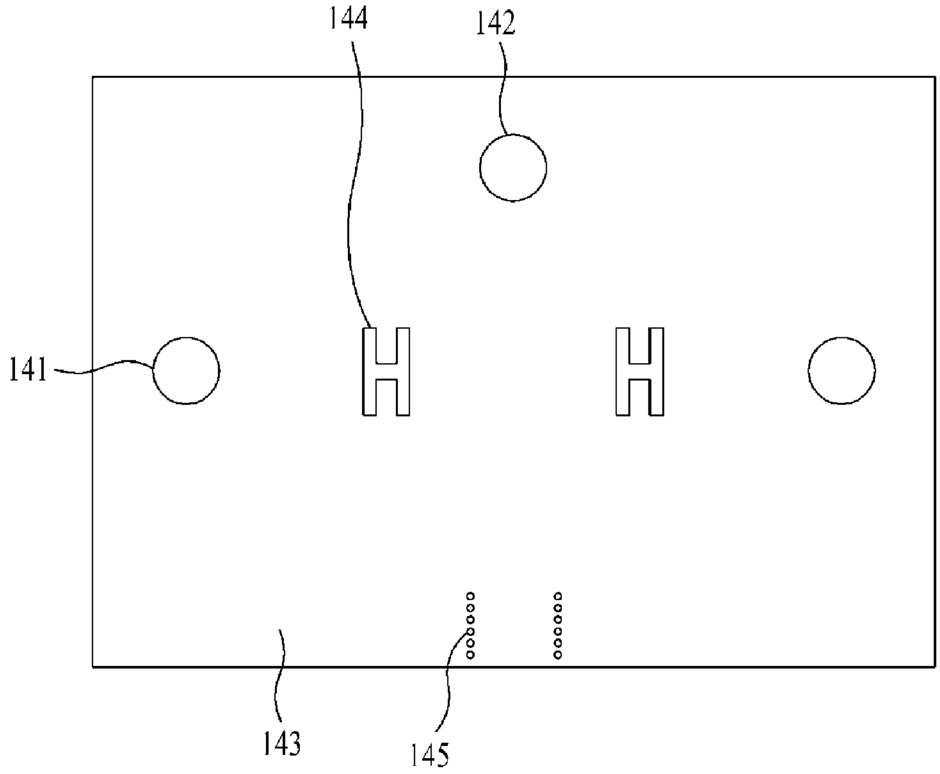
FIGS. 7A and 7B are views illustrating front and rear surfaces of a fourth substrate of a liquid crystal-based microstrip patch antenna employing a Meander line slot, according to an embodiment of the inventive concept.
Figure 7B:
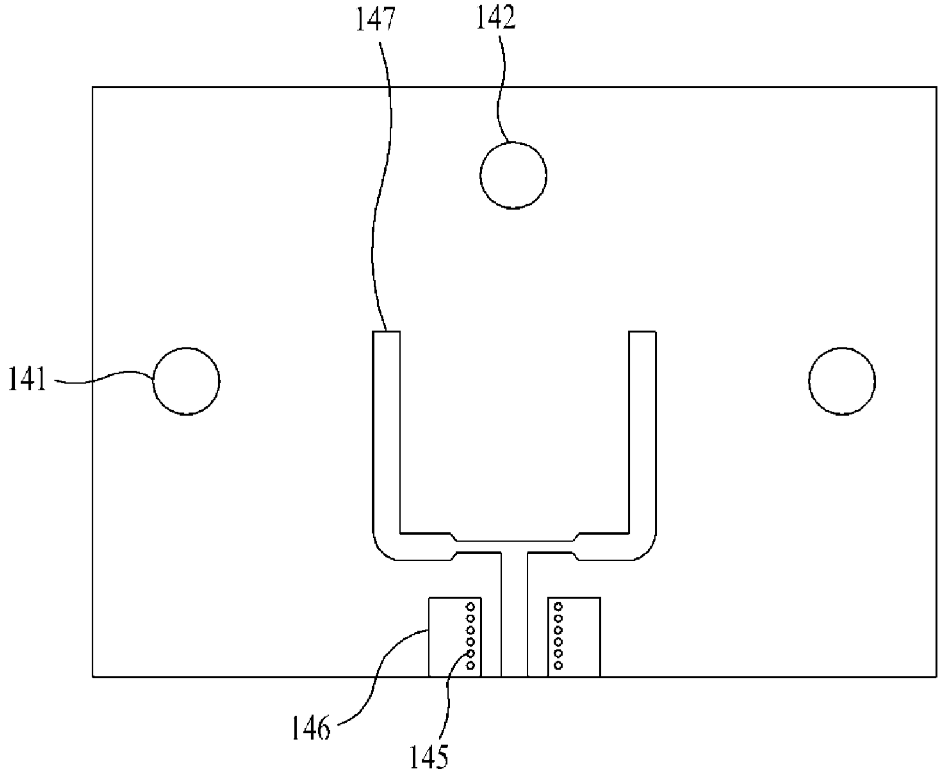

FIGS. 7A and 7B are views illustrating front and rear surfaces of the fourth substrate 140 of the liquid crystal-based microstrip patch antenna employing a Meander line slot, according to an embodiment of the inventive concept.

Referring to FIGS. 7A and 7B, the front surface of the fourth substrate 140 is the ground surface covered with a conductive metal material, except for the aperture coupling slot 144, a bias applying hole 141 for soldering the conductive line onto the soldering pad 115 of the first substrate, and a bias applying hole 142 for soldering the conductive line onto the soldering pad 134 of the third substrate.

The front surface of the fourth substrate 140 may propagate a radio wave to the first radiating unit 132 in an aperture coupling manner. This aperture coupling manner may prevent the radio wave from unintentionally leaking and being propagated in the direction of the antenna from the feeding circuit. However, the embodiments of the inventive concept are not limited to power feeding through the aperture coupling manner, and the microstrip patch antenna may select various manners depending on the use (a probe and a strip line) of the antenna.

For example, the aperture coupling slot 144 of the antenna 100 may be formed in the form of an H-slot, and such an H-slot may generally feed broadband frequencies. The H-slot shape is suitable for increasing an a frequency tunning amount of the antenna 100, but the embodiments of the inventive concept are not limited to a feeding structure having the corresponding form. For example, a T-slot shape may be selected to reduce the size of a back lobe of the antenna.

The position of the aperture coupling slot 144 of the antenna 100 may be positioned at the center of the first radiating unit 132 to maximize the coupling effect. The specific standard of the aperture coupling slot 144 is optimized according to impedance matching with the first radiating unit 132 of the antenna to be designed.

The fourth substrate 140 may perform a feeding operation to transmit or receive a radio signal to the first radiating unit 132 of the antenna 100. In addition to the coaxial line structure according to an embodiment of the inventive concept, the transition structure 146 for the feeding operation may be implemented in a feeding form, such as a wave guide, such that the transition structure 146 is suitable for a device employing the antenna 100.

A coaxial cable having the form of the microstrip line 147 for the feeding operation and the transition structure 146 between microstrip lines 147 may be provided on the rear surface of the fourth substrate 140. A plurality of conductive vias 145 may be disposed in the transition structure 146 to prevent the radio wave from leaking. The plurality of conductive vias 145 are coupled to the ground surface 143 of the front surface of the fourth substrate 140 through the dielectric substrate of the fourth substrate 140.

The width of the microstrip line 147 may be determined to be suitable for the propagation of the radio wave having the operating frequency band of the antenna 100. The width of the microstrip line 147 may be expressed as in following Equation 1, depending on the dielectric constant, a metal thickness, an impedance, and an operating frequency of the dielectric substrate to be used.

Equation 1

$$\frac{W}{h}=\begin{cases}\dfrac{8\varepsilon^{A}}{e^{2A}-2}, & \dfrac{W}{h}<2\\ \dfrac{2}{\pi}\left[B-1-\ln(2B-1)+\dfrac{\varepsilon_r-1}{2\varepsilon_r}\left\{\ln(B-1)+0.39-\dfrac{0.61}{\varepsilon_r}\right\}\right], & \dfrac{W}{h}\geq 2\end{cases}$$

In this case, h and Er represent the thickness of the dielectric substrate and the dielectric constant of the dielectric substrate, respectively. The values of "A" and "B" are given as in following Equation 2 and following Equation 3.

Equation 2

$$A=\frac{Z_0}{60}\sqrt{\frac{\varepsilon_r+1}{2}}+\frac{\varepsilon_r-1}{\varepsilon_r+1}\left(0.23+\frac{0.11}{\varepsilon_r}\right)$$

Equation 3

$$B=\frac{377\pi}{2Z_0\sqrt{\varepsilon_r}}$$

In this case, the characteristic impedance and the effective dielectric constant are given as in Equation 4 and Equation 5.

Equation 4

$$Z_0=\begin{cases}\dfrac{60}{\sqrt{\varepsilon_{eff}}}\ln\left(\dfrac{8h}{W}+\dfrac{W}{4h}\right), & \dfrac{W}{h}<1\\ \dfrac{120\pi}{\sqrt{\varepsilon_{eff}}\left\{\dfrac{W}{h}+1.393+0.667\ln\left(\dfrac{W}{h}+1.444\right)\right\}}, & \dfrac{W}{h}\geq 1\end{cases}$$

Equation 5

$$\varepsilon_{eff}=\frac{\varepsilon_r+1}{2}+\frac{\varepsilon_r-1}{2}\frac{1}{\sqrt{1+\dfrac{12h}{W}}}$$

Equation 1 is an equation derived when the metal thickness of the microstrip line is significantly less than the thickness of the dielectric substrate, and the width of the microstrip line may be modified appropriately, when designing and applying the antenna.

Figure 8A:
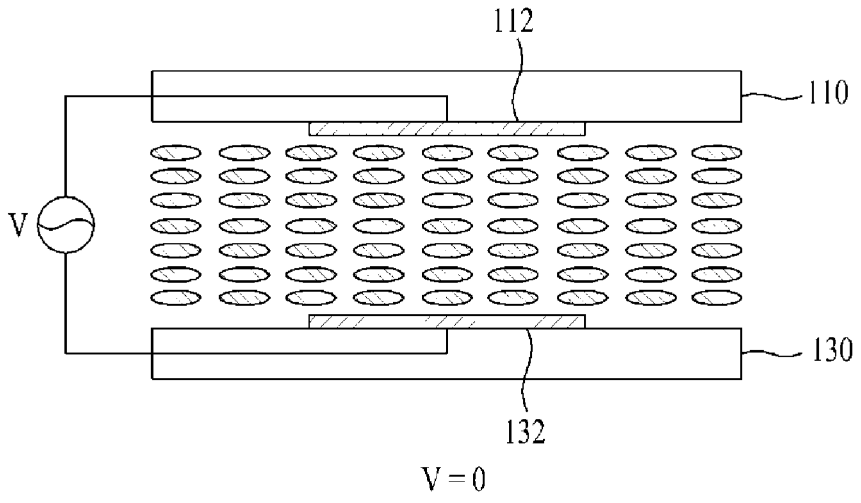
FIGS. 8A and 8B are schematic view illustrating a phase change of a liquid crystal molecule depending on whether a DC voltage is applied to a liquid crystal-based microstrip patch antenna employing a Meander line slot according to an embodiment of the inventive concept.
Figure 8B:
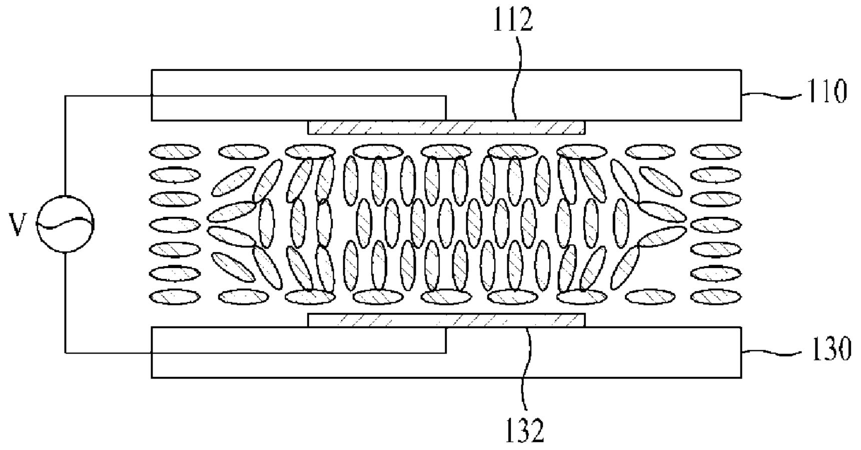

FIGS. 8A and 8B are schematic view illustrating a phase change of a liquid crystal molecule depending on whether a DC voltage is applied to a liquid crystal-based microstrip patch antenna employing a Meander line slot according to an embodiment of the inventive concept.

Referring to FIGS. 8A and 8B, the liquid crystal molecule in the microwave band may be modeled as a thin and long elliptical dielectric. Since the liquid crystal has different polarization in a major axis direction and a minor axis direction, the anisotropy of the dielectric constant may be made. The dielectric constant of the liquid crystal is expressed in the major axis direction and the minor axis direction.

The dielectric constant of the liquid crystal having the major axis aligned in an x direction may be expressed as a tensor as in Equation 6.

$$\overleftrightarrow{\varepsilon} = \begin{bmatrix} \varepsilon_{\parallel} & 0 & 0 \\ 0 & \varepsilon_{\perp} & 0 \\ 0 & 0 & \varepsilon_{\perp} \end{bmatrix} \quad \text{Equation 6}$$

In this case, when an electric field is strongly applied in the z direction, the dielectric constant, $\overleftrightarrow{\varepsilon}_{fully\ biased}$, of the liquid crystal becomes Equation 7.

$$\overleftrightarrow{\varepsilon}_{fully\ biased} = \begin{bmatrix} \varepsilon_{\perp} & 0 & 0 \\ 0 & \varepsilon_{\parallel} & 0 \\ 0 & 0 & \varepsilon_{\perp} \end{bmatrix} \quad \text{Equation 7}$$

An electric field may be formed on the second substrate 120 due to a potential difference between the first substrate 110 and the third substrate 130. When the electric field is applied, a liquid crystal molecule receives force such that the direction having the larger polarization is aligned in parallel to the electric field. Accordingly, the voltage control between the first substrate 110 and the third substrate 130 may control the degree of rotation of the liquid crystal molecule.

This results to the change of the dielectric characteristic in the microwave band. In the state in which the voltage is not applied (V=0) and the state in which the maximum voltage $V_{max}$) is applied, the effective dielectric constant ($\varepsilon_{eff}$) of the liquid crystal may be approximated to E1, and En. In the state in which the applied voltage (V) satisfies $0<V<V_{max}$, the effective dielectric constant ($\varepsilon_{eff}$) of the liquid crystal is given to satisfy $\varepsilon_{\perp}<\varepsilon_{eff}<\varepsilon_{\parallel}$. The dielectric anisotropy of the liquid crystal region of the antenna 100 becomes $\Delta\varepsilon=\varepsilon_{\parallel}-\varepsilon_{\perp}$.

Figure 9A:
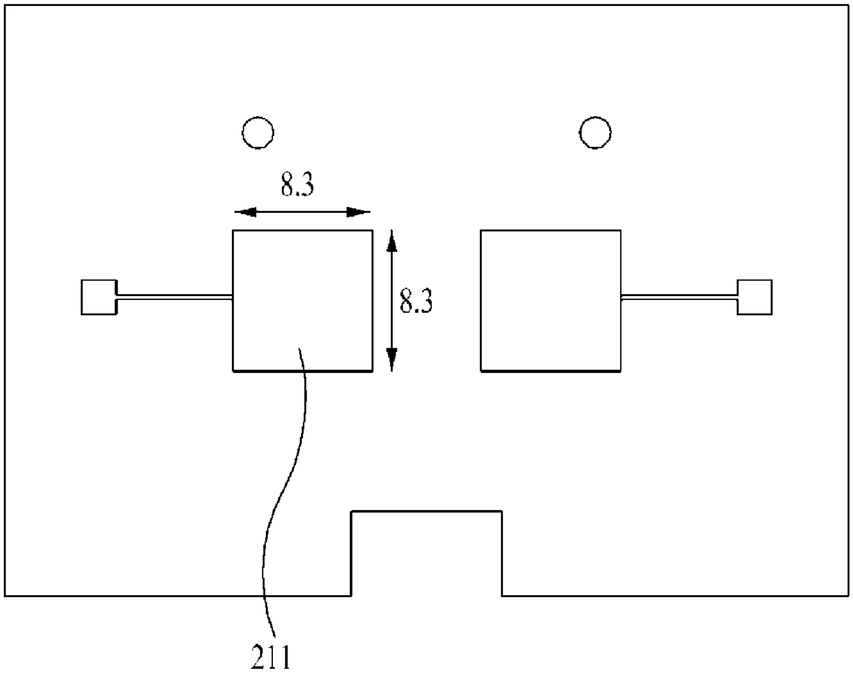
FIGS. 9A and 9B are views illustrating a first substrate patch, when a Meander line slot is not applied to a radiating unit and is applied to the radiating unit, according to an embodiment of the inventive concept.
Figure 9B:
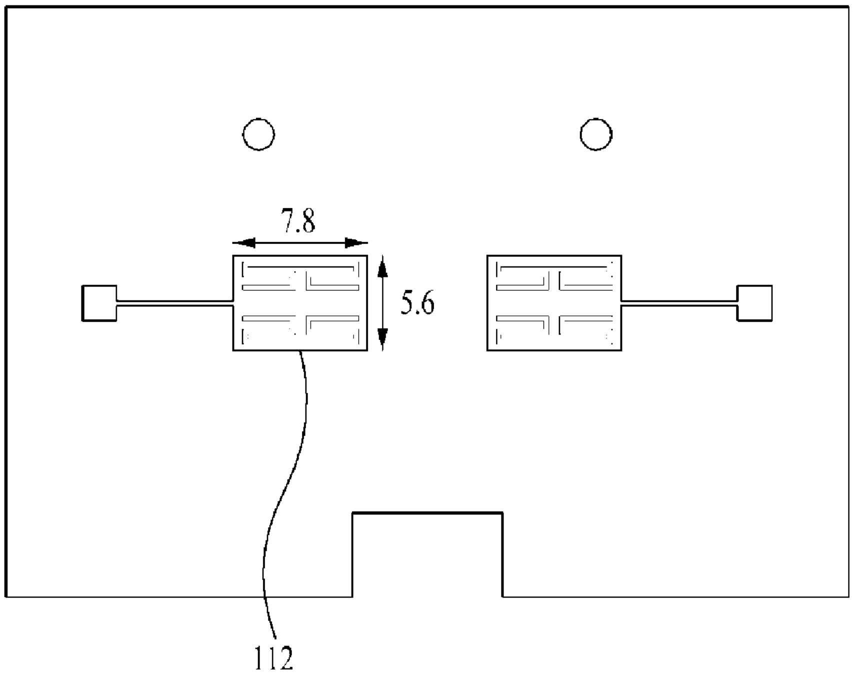

FIGS. 9A and 9B are views illustrating a first substrate patch, when a Meander line slot is not applied to a radiating unit and is applied to the radiating unit, according to an embodiment of the inventive concept. More specifically, FIG. 9A illustrates the first substrate patch including the specification of a patch length of a radiating unit on a rear surface of the first substrate, when the Meander line slot is not applied to the radiating unit, with respect to an antenna operating in the similar frequency band, and FIG. 9B illustrates the first substrate patch including the specification of a patch length of a radiating unit on a rear surface of the first substrate, when the Meander line slot is applied to the radiating unit, with respect to an antenna operating in the similar frequency band.

Referring to FIGS. 9A and 9B, it may be recognized that the size of the second radiating unit 112 employing the Meander line slot illustrated in FIG. 9B is significantly reduced as compared with the size of a radiating unit 211 not employing the Meander line slot, which is illustrated in FIG. 9A. According to an embodiment of the inventive concept, a patch area is reduced by about 37%. Although the size of the second radiating unit 112 employing the Meander line slot is significantly reduced as compared to the radiating unit 211 not employing the Meander line slot, the return loss is maintained to −10 dB or less. Accordingly, the antenna has no performance problem.

Figure 10A:
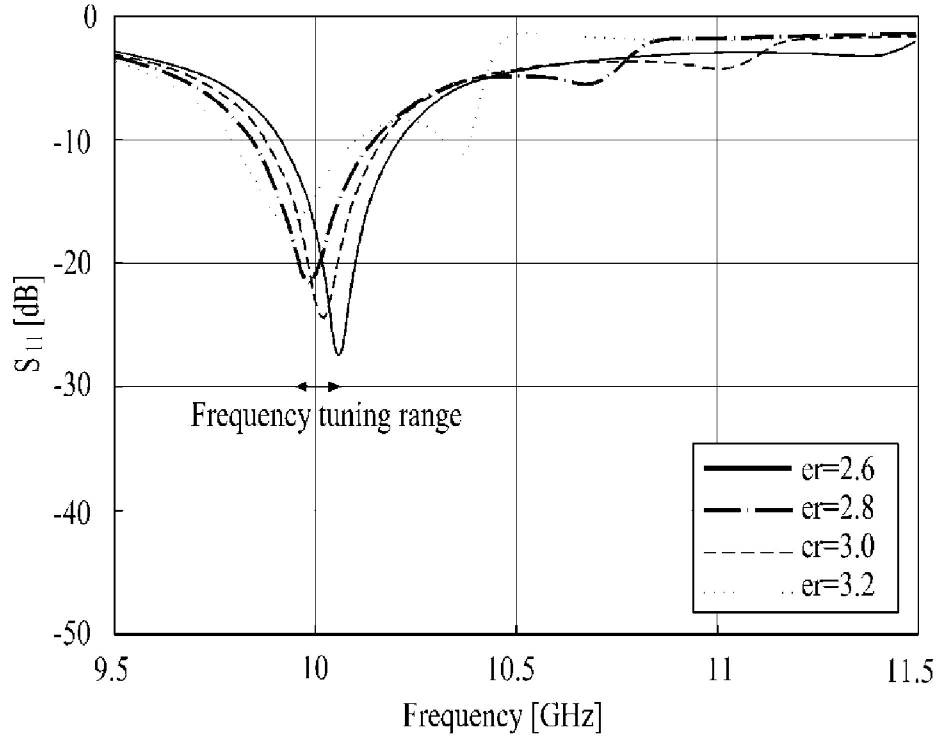
FIGS. 10A and 10B are views illustrating return loss for each frequency band of an antenna as a function of the variation of a dielectric constant of liquid crystal, when the Meander line slot is employed and not employed according to an embodiment of the inventive concept.
Figure 10B:
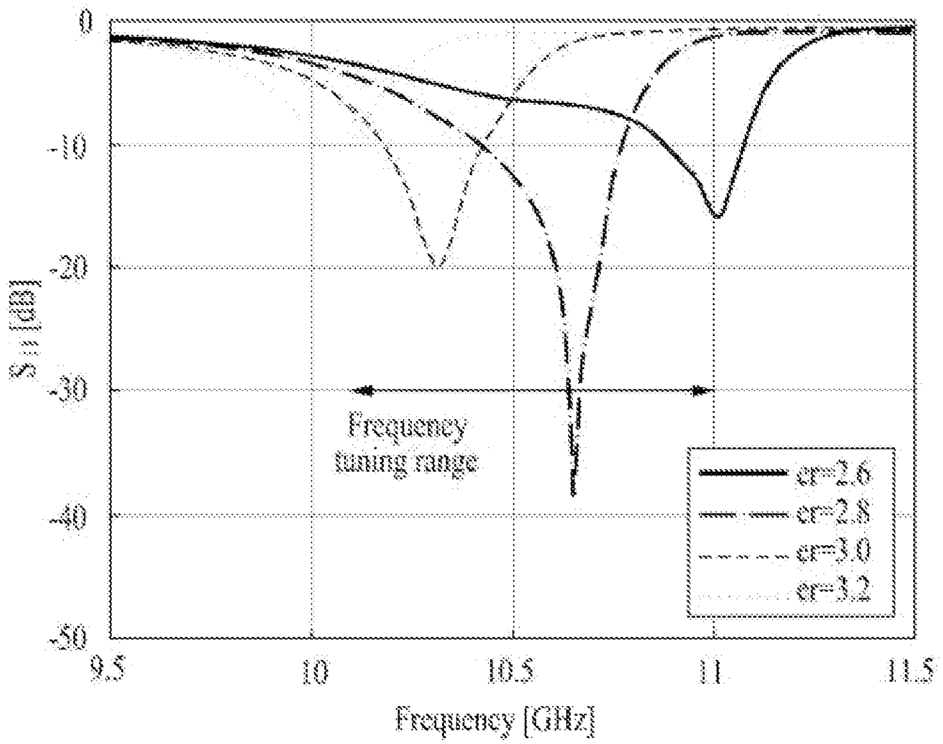

FIGS. 10A and 10B are views illustrating the return loss for each frequency band of an antenna as a function of the variation of a dielectric constant of liquid crystal, when the Meander line slot is employed and not employed, according to an embodiment of the inventive concept.

Referring to FIG. 10A, the variation of a resonance frequency, which results from the variation of the dielectric constant of the liquid crystal of the antenna not employing the Meander line slot, is about 0.12 GHz. Referring to FIG. 10B, the variation of a resonance frequency, which results from the variation of the dielectric constant of the liquid crystal of the antenna employing the Meander line slot, is about 1 GHz, which is significantly increased as compared with about 0.12 GHz.

Figure 11:
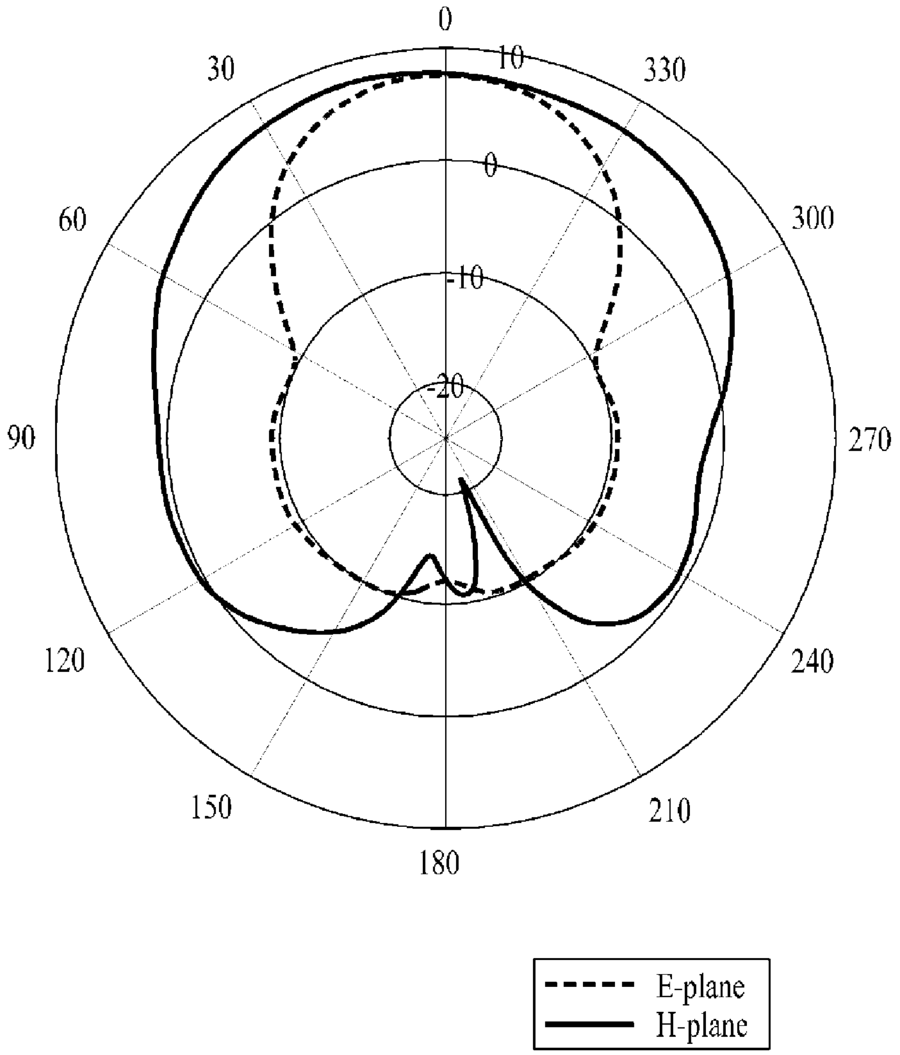
FIG. 11 is a view illustrating an E-plane and an H-plane of a radiation pattern of a liquid crystal-based microstrip patch antenna employing a Meander line slot depending on a dielectric constant of liquid crystal according to an embodiment of the inventive concept.

FIG. 11 is a view illustrating an E-plane and an H-plane of a radiation pattern of a liquid crystal-based microstrip patch antenna employing a Meander line slot depending on a dielectric constant of a liquid crystal, according to an embodiment of the inventive concept.

Referring to FIG. 11, when the dielectric constant of the liquid crystal dielectric of the antenna designed according to an embodiment of the inventive concept is 2.9, E-plane and H-plane radiation patterns may be recognized at a resonance frequency of 10.4 GHz.

A microstrip patch antenna having a narrowband characteristic is generally provided to employ a single frequency, but the antenna 100 according to an embodiment of the inventive concept may expand the frequency tuning range of a liquid crystal-based microstrip patch antenna, thereby widening the scope of employing wireless equipment.

As described above, embodiments of the inventive concept relate to widening a frequency tuning range of a variable-characteristic microstrip patch antenna using liquid crystal and to miniaturizing a radiating unit. According to embodiments of the inventive concept, the conventional microstrip patch antenna may have variable frequency characteristics by using the liquid crystal, and the frequency tuning range may be expanded by applying a Meander line slot. This increases the utilization of the conventional microstrip patch antenna which has a limitation when used in the multi-band or broadband due to the narrowband characteristics.

In addition, according to embodiments of the inventive concept, the size of the antenna may be dramatically reduced as compared to the conventional radiating unit by using the radiating unit employing the Meander line slot, and an antenna suitable for a small device, which supports various wireless communication services, may be provided.

According to embodiments of the inventive concept, the utilization of use of the conventional microstrip patch antenna with the narrowband characteristic is greatly expanded, and the radiating unit of the antenna is miniaturized to be applied to various wireless device designs.

According to embodiments of the inventive concept, there may be provided the liquid crystal-based microstrip patch antenna for widening the frequency tuning range and miniaturizing the radiating unit, capable of widening the frequency tuning range by increasing the frequency tuning amount even with the radiating unit smaller than the conventional radiating unit, as the Meander line slot is applied to the microstrip patch.

According to embodiments of the inventive concept, there may be provided the liquid crystal-based microstrip patch antenna for widening the frequency tuning range and miniaturizing the radiating unit. The liquid crystal-based microstrip patch antenna may be miniaturized and mounted in a smaller device supporting various wireless communication services, as the size of the radiating unit is significantly reduced as compared to the conventional radiating unit, by applying the Meander line slot to the radiating unit.

It will be understood that when a component is referred to as being coupled with/to" or "connected to" another component, the component may be directly coupled with/to or connected to the another component or an intervening component may be present therebetween. Meanwhile, it will be understood that when a component is referred to as being directly coupled with/to" or "connected to" another component, an intervening component may be absent therebetween.

The terminology used herein to describe a specific embodiment is not intended to limit the scope of the inventive concept. The singular forms are intended to include the plural forms unless the context clearly indicates otherwise. In the disclosure, it will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, parts, and/or the combination thereof.

Although the terms "first", "second", etc. may be used to describe various components, the components should not be construed as being limited by the terms. The terms are only used to distinguish one component from another component.

Meanwhile, the terms '~unit', '~or', '~module' may refer to the unit of processing at least one function or operation. This may be implemented in hardware, software, or the combination of hardware and software.

In addition, a component according to an embodiment described with reference to a relevant drawing is not limited to the embodiment, but may be implemented to be included in another embodiment without departing from the scope of the inventive concept. Furthermore, it should be obvious to those skilled in the art that a plurality of embodiments are able to be integrated into one embodiment, without a separate indication.

In addition, in the following description made with reference to accompanying drawings, the same component will be assigned with the same or like reference numeral, regardless of a drawing number, and the duplication thereof will be omitted to avoid redundancy. In addition, in the following description of the inventive concept, a detailed description of well-known art or functions will be ruled out in order not to unnecessarily obscure the gist of the inventive concept.

Hereinabove, although the inventive concept has been described with reference to embodiments and the accompanying drawings, the inventive concept is not limited thereto, but may be variously modified and altered by those skilled in the art to which the inventive concept pertains without departing from the spirit and scope of the inventive concept claimed in the following claims. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A microstrip patch antenna based on liquid crystal, comprising:

at least one feeding unit;

a first radiating unit, having a first direct current direct constant (DC) bias line configured to receive power from a power supply;

a second radiating unit, having a second DC bias line configured to receive power from the power supply;

a plurality of dielectric substrates including the at least one feeding unit, the first radiating unit, and the second radiating unit, wherein the plurality of dielectric substrates is formed in a stack structure, and wherein the first radiating unit, the second radiating unit, and the at least one feeding unit are each on different dielectric substrates;

a liquid crystal cavity, wherein the liquid crystal cavity is interposed between the plurality of dielectric substrates such that the liquid crystal cavity is disposed above the first radiating unit and below the second radiating unit, and has a structure filled with a liquid crystal; and a ground surface disposed below the first and second radiating units, the liquid crystal cavity, and the first and second DC bias lines, wherein the at least one feeding unit is coplanar with the ground surface; and wherein the first and second DC bias lines are configured to apply an electric field to the liquid crystal cavity through the first and second radiating units.

2. The microstrip patch antenna of claim 1, wherein the feeding unit has a feeding structure including an aperture coupling slot to transmit or receive a broadband frequency signal, as a resonance frequency of the antenna varies.

3. The microstrip patch antenna of claim 2, wherein the aperture coupling slot has a form of an H-slot to feed a broadband frequency.

4. The microstrip patch antenna of claim 1, wherein the first and/or second radiating unit includes:

a conductive metal patch including a Meander line slot to widen a tuning range of an operating frequency of the antenna and to miniaturize the antenna.

5. The micro strip patch antenna of claim 1, wherein the first and second radiating units are provided in a patch type; and wherein a potential difference between the first radiating unit and the second radiating unit changes an intensity of the electric field applied to the liquid crystal cavity, such that a dielectric characteristic of the liquid crystal varies.

6. The microstrip patch antenna of claim 1, wherein the liquid crystal is injected into the liquid crystal cavity through one of the plurality of dielectric substrates.

7. The microstrip patch antenna of claim 1, wherein the liquid crystal cavity is interposed between the first radiating unit and the second radiating unit, and determined to be larger than patches of the first and second radiating units, based on a fringe field of a resonance region.

8. The microstrip patch antenna of claim 1, wherein the first DC bias line is disposed in the first radiating unit, and is to supply power from an external power supply of the antenna to have a potential difference from the ground surface, such that a phase of the liquid crystal is changed by inducing a change in a dielectric characteristic of the liquid crystal.

9. The microstrip patch antenna of claim 5, wherein the first DC bias line is configured to apply a voltage to the first radiating unit; and the second DC bias line is configured to apply a voltage to the second radiating unit.

10. A microstrip patch antenna based on liquid crystal, comprising:

a first substrate including a second radiating unit provided in a patch type, a second DC bias line to receive power from a power supply such that a voltage is applied to the second radiating unit, and an injecting hole for injecting a liquid crystal;

a second substrate disposed under the first substrate, and including a liquid crystal cavity for receiving the liquid crystal;

a third substrate disposed under the second substrate, and including a first radiating unit provided in the patch type and a first DC bias line to receive the power from the power supply such that a voltage is applied to the first radiating unit; and a fourth substrate disposed under the third substrate, and including a feeding unit and a ground surface and having a feeding structure to transmit a signal from the feeding unit to the first radiating unit, wherein the feeding unit is coplanar with the ground surface.

11. The microstrip patch antenna of claim 10, wherein the first substrate, the second substrate, the third substrate, and the fourth substrate are a plurality of dielectric substrates formed in a stack structure.

12. The microstrip patch antenna of claim 10, wherein the second radiating unit includes:

a conductive metal patch including a Meander line slot to widen a tuning range of an operating frequency of the antenna and to miniaturize the antenna.

13. The microstrip patch antenna of claim 10, wherein the second DC bias line is connected to the second radiating unit to apply a voltage to make a potential difference with the first radiating unit of the third substrate.

14. The microstrip patch antenna of claim 10, wherein the liquid crystal cavity is interposed between a plurality of dielectric substrates including the first radiating unit and the second radiating unit, and wherein the liquid crystal is injected into the liquid crystal cavity through the injecting hole.

15. The microstrip patch antenna of claim 10, wherein the liquid crystal cavity is provided under the second radiating unit of the first substrate, and determined to be larger than a patch of the second radiating unit, based on a fringe field of a resonance region.

16. The microstrip patch antenna of claim 10, wherein a potential difference between the second radiating unit and the first radiating unit changes an intensity of an electric field applied to the liquid crystal cavity of the second substrate, such that a dielectric characteristic of the liquid crystal varies.

17. The microstrip patch antenna of claim 10, wherein the first DC bias line is disposed in the first radiating unit of the third substrate to supply power from an external power supply of the antenna to have a potential difference from the ground surface, such that a phase of the liquid crystal is changed by inducing a change in a dielectric characteristic of the liquid crystal.

18. The microstrip patch antenna of claim 10, wherein the feeding unit has a feeding structure including an aperture coupling slot to transmit and receive a broadband frequency signal, as a resonance frequency of the antenna varies.

19. The microstrip patch antenna of claim 18, wherein the aperture coupling slot has a form of an H-slot to feed a broadband frequency.

20. The microstrip patch antenna of claim 10, wherein the fourth substrate includes:

a microstrip line; and a transition structure between a coaxial line for power-feeding of the microstrip line, wherein a plurality of conductive vias is disposed in the transition structure.

* * * * *